United States Patent [19]

Eckman et al.

[11] Patent Number: 5,137,631
[45] Date of Patent: Aug. 11, 1992

[54] MULTIPLE BUNDLE PERMEATOR

[75] Inventors: Thomas J. Eckman, Hockessin; Donald W. Edwards; Presley P. Goodwyn, Jr., both of Wilmington, all of Del.

[73] Assignee: E. I. du Pont de Nemours and Company, Wilmington, Del.

[21] Appl. No.: 780,348

[22] Filed: Oct. 22, 1991

[51] Int. Cl.$^5$ .............................. B01D 63/04
[52] U.S. Cl. .......................... 210/321.8; 210/321.89; 210/500.23
[58] Field of Search .......... 210/321.6, 321.64, 321.72, 210/321.78, 321.79, 321.8, 321.82, 321.87, 321.88, 321.89, 321.9, 500.23

[56] References Cited

U.S. PATENT DOCUMENTS

| | | | |
|---|---|---|---|
| 3,979,190 | 9/1976 | Hedman | 55/158 |
| 4,293,419 | 10/1981 | Sekino et al. | 210/321.1 |
| 4,451,369 | 5/1984 | Sekino et al. | 210/321.1 |
| 4,622,143 | 11/1986 | Edwards | 210/321.1 |
| 4,670,145 | 6/1987 | Edwards | 210/321.1 |
| 4,675,109 | 6/1987 | Applegate et al. | 210/321.1 |
| 4,775,471 | 10/1988 | Nagai et al. | 210/323.2 |
| 4,781,832 | 11/1988 | Takemura et al. | 210/321.8 |
| 4,871,379 | 10/1989 | Edwards | 55/158 |
| 4,876,012 | 10/1989 | Kopp et al. | 210/644 |
| 5,013,331 | 5/1991 | Edwards et al. | 55/16 |

*Primary Examiner*—Frank Sever

[57] ABSTRACT

A hollow-fiber membrane fluid-separation apparatus containing a plurality of hollow-fiber bundles is disclosed. The apparatus comprises a single-pressure container with a center chamber located in between facing ends of each bundle. The center chamber is in communication with an annular space around adjacent bundles and a discharge tube concentrically housed within a feed tube. The hollow-fiber membrane fluid separation apparatus is adapted for industrial performance with high volumetric efficiency and high solute rejection. A process for separation of fluids is also provided.

9 Claims, 6 Drawing Sheets

MULTIPLE BUNDLE PERMEATOR

FIELD OF THE INVENTION

The present invention relates to a fluid separation apparatus, particularly to a fluid separation apparatus using hollow-fiber membranes having a selective permeability to fluid. More particularly, it relates to enlargement of a hollow-fiber membrane apparatus in order to adapt it for industrial performance.

BACKGROUND OF THE INVENTION

The fluid separation apparatus for separating components of fluid by using a membrane having a selective permeability is applied to various techniques such as gas permeation, liquid permeation, dialysis, ultrafiltration, reverse osmosis, or the like. Recently, attention has been particularly given to the reverse osmosis which is especially effective for desalination and purification of sea water or brackish water, for recovering useful or harmful components from waste water or for reuse of water. Membrane separation apparatuses are employed for carrying out these techniques and are classified into flat membrane type, tubular type, spiral type and hollow-fiber type according to the shape and form of the semi-permeable membrane used therein. Among these, a hollow-fiber type apparatus has very high membrane separation efficiency per unit volume of the apparatus because no substrate for the semi-permeable membrane is needed. Hollow-fiber membranes are particularly suited for reverse osmosis separations.

The reverse osmosis is usually carried out by treating a fluid under pressure higher than the osmotic pressure of the fluid, by which the components of fluid are separated via a membrane having a selective permeability. The pressure may vary with the kinds of fluids to be treated, the properties of the selectively permeable membranes, or the like, but is usually in the range from 40 to 2,000 psi for hollow-fiber membranes. Accordingly, it is very important that the membrane, the supporting material and the casing vessel used for the reverse osmosis should have a high pressure resistance.

There is a tendency in the fluid separation industry to enlarge an apparatus to be used in the membrane separation techniques in order to adapt it for industrial performance. Particularly, enlargement of a reverse osmosis hollow-fiber apparatus is of great advantage to adapt it for industrial performance because the apparatus has high volumetric efficiency. The larger-size apparatus can feed a much larger amount of fluid than that of a conventional apparatus. In comparison with a conventional apparatus, a large-size fluid separation apparatus has many advantages including: (a) the cost per unit volume of the apparatus can be reduced; (b) the steps of manufacturing process of a hollow-fiber assembly can be reduced; (c) and the number of external pipings, valves and instruments equipped around the apparatus can be reduced. Accordingly, in the case of carrying out a large-scale membrane separation treatment, a large-sized apparatus, which needs fewer parts than those of a conventional apparatus, is desired.

Two conventional methods are known to enlarge a hollow-fiber membrane separation apparatus. One is elongation of the apparatus. The other is enlargement of the diameter of the apparatus. However, when the apparatus is elongated, fluid to be treated is difficult to flow through inside of the hollow fiber because the distance between the opening ends of the hollow fiber become long and pressure loss of the fluid is increased. This results in polarization down the length of each hollow fiber, ultimately resulting in non-uniform flow of the permeate through each hollow-fiber membrane. For example, in the case of a single-ended hollow-fiber bundle in which one end of the bundle is plugged, the fluid pressure inside each hollow fiber may be an order of magnitude greater at the sealed end versus the open end. Consequently, the rate of permeate flow through the hollow-fiber membrane increases from the sealed end to the open end. The percentage of solute rejection will typically increase from the sealed end to the open end of each hollow fiber. The ultimate impact is non-uniform flow of permeate, poor non-uniform salt rejection and a greater tendency to foul the apparatus. This problem is magnified in an apparatus with a reverse osmosis membrane of hollow fiber. Such a fluid separation device has a greater pressure resistance in comparison with other types of membranes such as flat-membrane type, tubular type or spiral type.

On the other hand, when the diameter of the apparatus is enlarged, cost of the pressure vessel increases rapidly. Moreover, depending on the geometry of the apparatus, the enlarged diameter may result in increases in the pressure drop of the reject fluid flowing radially through the bundles. As a result, the reject flow rate of the fluid through the device must be increased which results in having to operate at lower conversion and which ultimately increases the opening costs. The enlarged diameter of the apparatus may also cause a concentration polarization phenomenon at the areas where the flow rate of the fluid to be treated is small or the fluid stays, because the flow of the fluid through and across the hollow-fiber layer surface becomes uneven, between the inner portion and the outer portion in the layer.

At the same time, it is economical to enlarge the ratio of length/radius of the cylindrical pressure vessel which contains the membrane assemblies, in view of scale-up. In other words, it is preferable to enlarge the apparatus in the longitudinal direction.

The prior art describes hollow-fiber membrane-type fluid separation apparatuses where at least one pair of hollow-fiber assemblies are contained. The configuration of the hollow-fiber bundles facilitates the separation of large volumes of liquid by arranging the hollow-fiber assemblies in series. A pair of permeate fluid pipes may be arranged internally in order to pass the concentrated permeate fluid from one hollow-fiber bundle directly into the second hollow-fiber bundle for further separation by reverse osmosis. However, these devices often require complicated hardware and multiple pressure compartments within the pressure vessel. Also, the fluid to be treated is separated by bundles in series thereby reducing the volumetric efficiency of the apparatus.

The prior art also describes a hollow-fiber membrane separation apparatus which comprises independent pressurized compartments within the pressure vessel, each containing one bundle of hollow-fiber membranes. The independent pressurized compartments are connected by a series of passages. Such independent pressurized compartments are costly to construct and are prone to failure.

The present invention provides a large-sized hollow-fiber membrane separation apparatus in which a plurality of shorter hollow-fiber bundles are confined within one pressurized compartment and which keeps the advantages of the prior art, with minimum permeate pressure loss down the bore of the hollow fibers and minimum concentration polarization phenomenon. The inventive fluid separation apparatus is a simple, economical device which may be readily adapted from an existing single-bundle fluid-separation apparatus. The present invention also facilitates so-called "inside out" flow of the fluid to be separated. These objectives, as well as other objects and advantages of the present invention, will become apparent to those skilled in the art from the following description.

SUMMARY OF THE INVENTION

The present invention is a simple, efficient, low-cost fluid-separation apparatus which contains a plurality of hollow-fiber assemblies in a single-pressure vessel. In such hollow-fiber assemblies, a tube sheet is provided at a terminal of each hollow-fiber bundle, the lumens of said hollow fibers being opened into the tube sheet. A plurality of hollow-fiber bundles are installed in a pressure vessel. The pressure vessel is a cylindrical shell with end plates. The end plates are sealed to form one pressure container. The hollow-fiber bundles are longitudinally placed end-to-end in the container. A small center chamber is located between the facing ends of each adjacent bundle.

The flow of the fluids through the apparatus is so-called "inside-out" flow. The feed fluid passes into the fluid-separation apparatus through a central feed tube. The feed fluid is simultaneously distributed to all fiber bundles through distributing holes or perforations in the feed tube. The hollow-fiber membranes are selective to one or more of the fluids, so such fluids will pass into the permeable fibers much more quickly than the other fluids. The product fluid or the permeate flows through a tubesheet and is collected at one or more ends of the fiber bundles. The end of each hollow-fiber bundle adjacent to the center chamber is sealed to prevent the feed fluid from bypassing the fibers by discharging into the center chamber. In summary, feed fluid generally travels through all bundles in the same pattern; i.e., radially from the feed tube into the hollow fibers, selectively permeating the hollow fibers. The permeate then exits the hollow fibers at open ends. The permeate may now be removed from the fluid separation apparatus. The amount of permeate removed in a function of the properties of the hollow fiber, feed temperature, the composition of the feed fluid, the feed to permeate pressure differential and the flow rate of the feed fluid.

The residue fluid is extracted simultaneously from all bundles by flowing radially outward through the bundles; the residue fluid does not readily permeate the hollow-fiber membranes. The residue fluid is then collected in the annular space in between the hollow-fiber bundle and flows into the center chamber located between the facing ends of each adjacent bundle. The residue fluid then passes through a so-called "center adapter" (which is an opening in the feed tube) and into a tube that is housed inside the feed tube. The residue fluid from all bundles is ultimately discharged through one or both of the end plates by means of such housed discharge tube.

The design of the apparatus facilitates inside-out flow scheme which reduces the likelihood of nestling of the hollow-fiber membranes. When the feed fluid is introduced to the outside of the hollow-fiber bundle, flowing inward to the center, there is a tendency for the hollow fibers to nestle. This effect results in increased bundle pressure drop with accompanying reduction in permeate flow. The likelihood of fouling is also increased as fibers press more closely together.

Multiple bundles may be connected in series by simply repeating the center-chamber configuration, allowing the collection of residue fluid from each subsequent bundle to be discharged in the tube that is concentrically housed in the feed tube. Another embodiment of the present invention is that multiple permeators, each containing a plurality of bundles, may readily be connected in series to increase conversion at a given velocity of feed flow.

The use of the center chamber, the "center adapter" and the discharge tube that is housed inside the feed tube facilitates the objects of the present invention. The fluid-separation apparatus may be enlarged by using multiple bundles, preferably two bundles, aligned in parallel in a single pressure vessel. The use of multiple bundles with fibers of shorter active length increases the efficiency of the unit because the pressure loss down the longer length of one larger bundle is detrimental. The short bundles can produce greater flow at higher solute rejection than a large single-bundle apparatus. The use of multiple short bundles also reduces the likelihood of fouling and adverse concentration polarization or gradients across the length of hollow fibers. External piping and porting around the apparatus can be reduced, resulting in greater durability and lower installation costs for the end user. More important, existing bundle design for traditional single-bundle permeators may be used for the present invention, thereby reducing the cost of retrofitting or redesigning existing hollow-fiber bundles. Also, cost of constructing this inventive fluid-separation apparatus is lower than the cost for comparable prior art devices, ultimately reducing the cost-per-unit volume of permeate. The present invention has the added advantage that the permeate discharged from each hollow-fiber bundle has substantially the same purity.

BRIEF DESCRIPTION OF THE DRAWINGS

The fluid-separation apparatus of the present invention will be illustrated in more detail with reference to the following accompanying drawings.

DETAILED DESCRIPTION OF THE INVENTION

Figure 1:
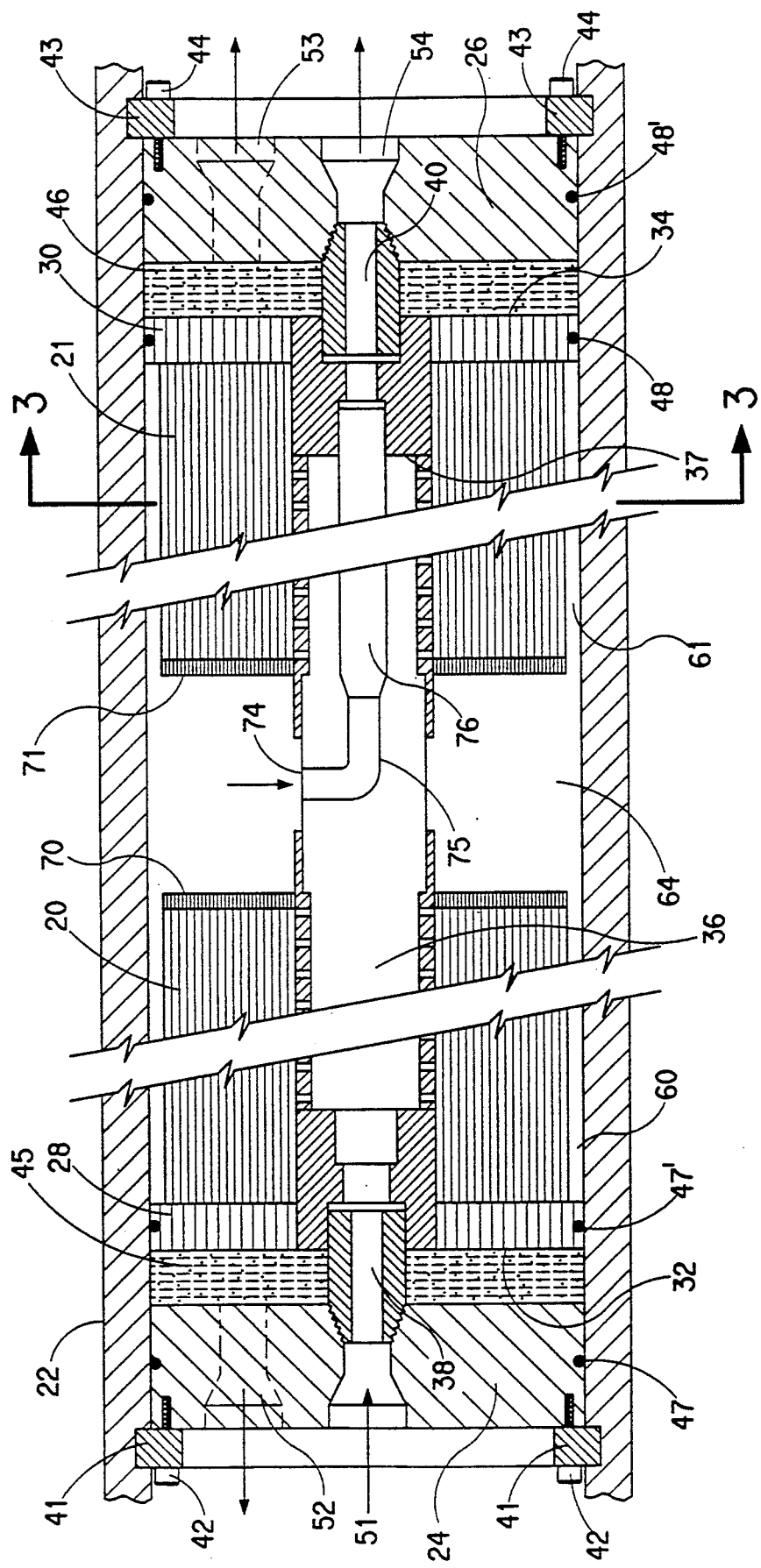
FIG. 1 is a cross-sectional view of the first embodiment of the present invention.

FIG. 1 shows two hollow-fiber bundles, 20 and 21; inside a pressure container, 22 preferably being an elongated cylindrical pressure vessel; enclosed by end caps, 24 and 26. There are tube sheets, 28 and 30, at the ends of both bundles adjacent to the end caps, 24 and 26, where the fibers are joined or sealed with epoxy and faces, 32 and 34, are cut back to expose the bores of the hollow fibers to fluid communication through the bundles. The cross-sectional configuration, (i.e., the configurations lying in a plane perpendicular to the longitudinal orientation of the hollow fiber membranes) of tube sheets is usually generally circular, it is also apparent that the cross-sectional configuration may be in any other form such as triangular, trilobal, square, rectangular, trapezoidal, pentagonal, hexagonal, free form, or the like. The maximum cross-sectional dimension of the tube sheet may also vary substantially. The face of the tube sheet may be any suitable configuration and is generally substantially the same configuration as the cross-sectional configuration of the tube sheet. The face may be substantially flat or may be curved or irregular in surface contour. The tube sheet may contain one or more bundles of hollow fiber membranes, preferably one bundle.

The center of each bundle contains a feed tube, 36, extending from one tube sheet, 32, to the other, 34. The end plates, 24 and 26, are threaded to accept flow channel adaptors, 38 and 40, which are likewise threaded. Flow channel adaptors, 38 and 40, may be fitted with seals, such as O-rings, in order to form a secure seal with the tube sheet and open to the feed tube.

End plate, 24, is held in place in the pressure container, 22, by means of bolts, 42, and segmented ring, 41; likewise, end plate, 26, is held in place in the pressure container, 22, by means of bolts, 44, and segmented ring, 43.

Feed tube, 36, has holes or perforations bored in the wall of the feed tube so as to allow the feed fluid to radially flow into both hollow-fiber bundles, 21 and 22. The size, location and configuration of the openings is not critical; however, the openings should facilitate uniform radial flow of the feed fluid into bundles, 20 and 21. The openings are preferably circular holes with a diameter of 0.1 cm to 2.0 cm.

Porous support blocks, 45 and 46, are situate adjacent to tube sheets, 28 and 30, respectively. O-rings, 47, 47', 48 and 48', serve to prevent leaks between different compartments of the permeator. Seals, such as O-rings, seal between the cavity wall to create an enclosed inner volume. It is advantageous to seal on the inner surface of the permeator. As the bundles expand and contract, or shift slightly with different operating conditions, the seals, 47, 47', 48 and 48', can slide axially while maintaining a seal. Port, 51, provides means for external fluid communication for the feed fluid. Ports, 52 and 53, provide external fluid communication for the permeate or product fluid. Port, 54, provides external fluid communication for the reject, or residue, fluid. Port, 54, may alternatively be located at the same end of the apparatus as port, 51, preferably being concentrically located within port, 51.

Figure 3:
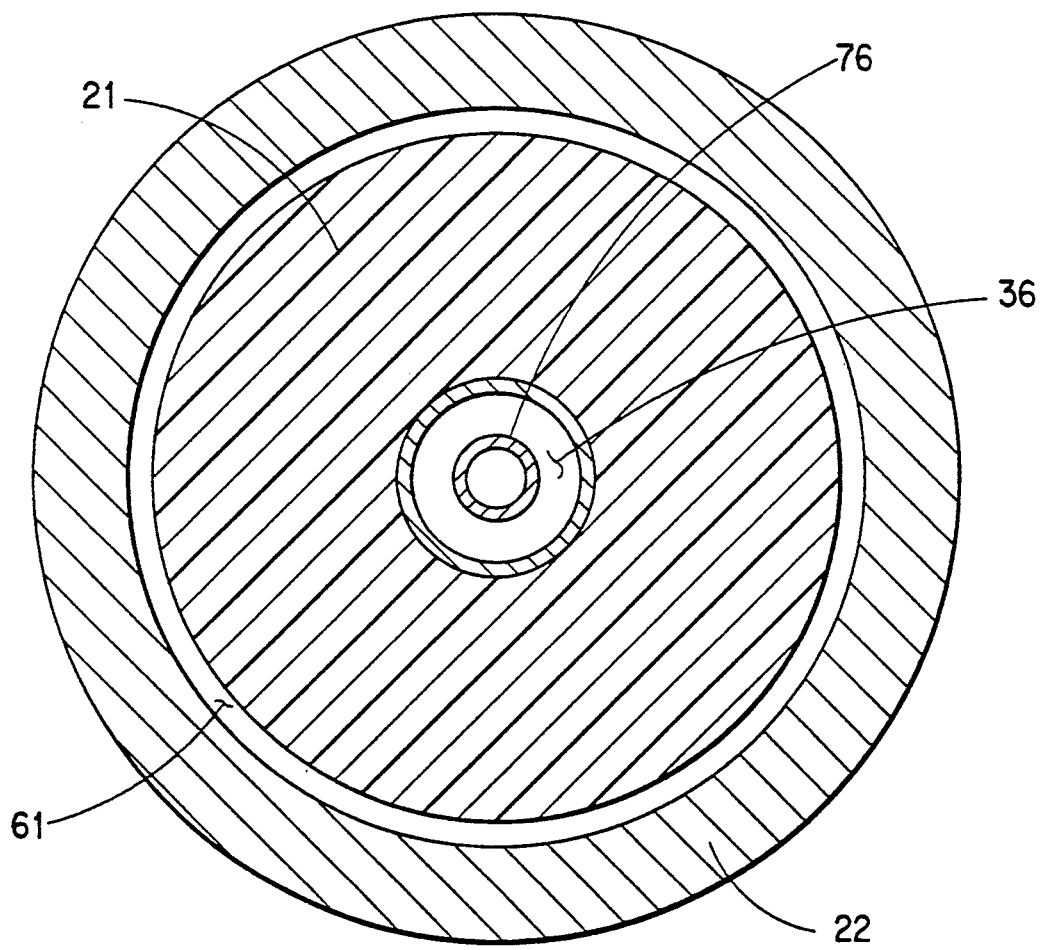
FIG. 3 is a cross-section taken on 3—3 of FIG. 1.

Hollow-fiber bundles, 20 and 21, are fitted within the pressure vessel, 22, so as to form spaces, 60 and 61, preferably being annular spaces. In between the facing ends of the two bundles, 20 and 21, is the so-called center compartment, 64. The end of the bundle, along with bores of each hollow-fiber membrane, 70 and 71, facing the center compartment, 64, are sealed with potting material so as to prevent the feed fluid from bypassing the fibers and discharging into the center compartment. At this end of the bundle, the hollow fibers are customarily looped or sealed to direct the permeate to the tubesheet end of the bundle and to prevent the discharge of permeate into the center compartment. The center compartment is defined by the sealed ends of the adjacent bundles, provided that the center compartment, 64, is in communication with annular spaces, 60 and 61, around the bundles, 20 and 21. The feed tube, 36, extends into and through the central compartment, further extending into bundle, 21, and being sealed with end cap, 37, so as to prevent the mixing of feed fluid with the permeate or residue fluid. An opening, 74, is placed in the feed tube so as to permit the flow of residue fluid. A pipe fitting, 75, is secured to the opening in the feed tube. The fitting is connected to a discharge tube, 76, which is housed within feed tube, 36. This arrangement is more particularly shown in FIG. 3 which is a cross-sectional view taken along line 3—3 of FIG. 1. The discharge tube, 76, extends through end cap, 37, and is connected to adaptor, 40, which provides means for external fluid communication outside of the pressure container via port, 54.

Figure 5:
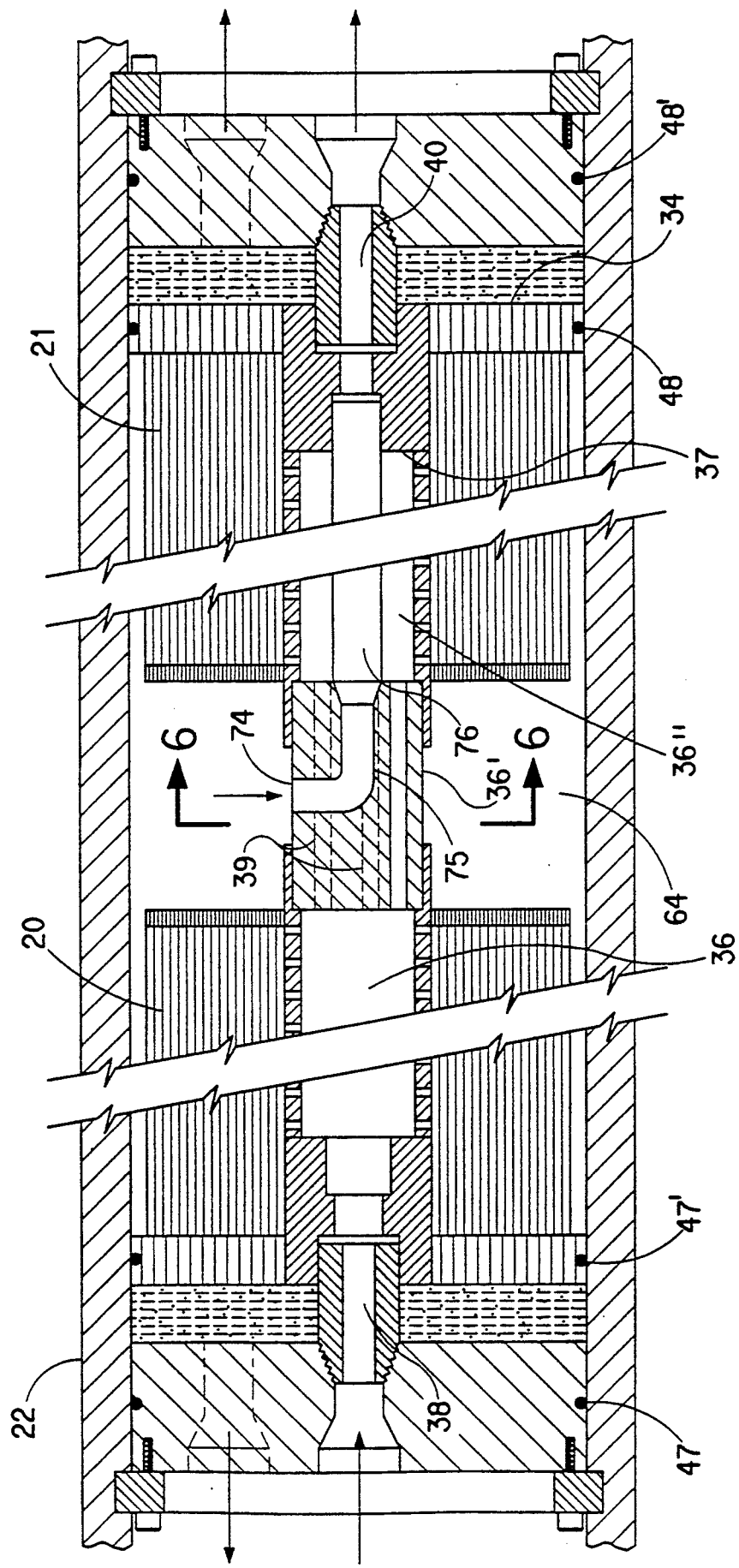
FIG. 5 is a cross-sectional view showing an embodiment of the feed tube and the center adapter.
Figure 6:
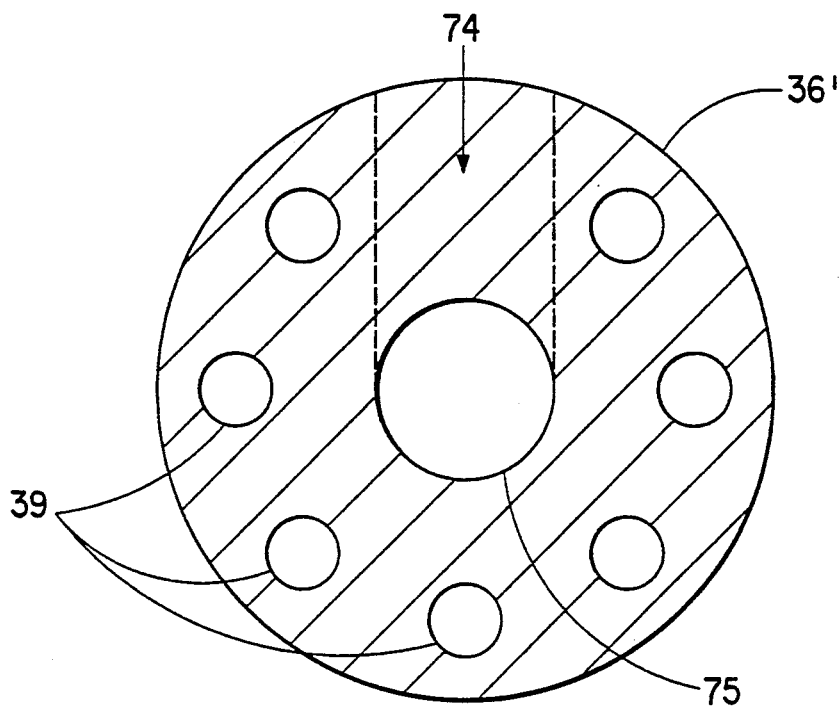
FIG. 6 is a cross-section taken on line 6—6 of FIG. 5.

In the present embodiment the discharge tube is concentrically housed with the feed tube; however, the size, configuration and location of opening, 74, pipe fitting, 75, and discharge tube, 76, are not important as long as they can accommodate the flow of residue fluid. The preferred embodiment of the feed tube assembly is shown in FIG. 5. The feed tube comprises three sections, the first being the portion of the feed tube assembly, 36', extending through the first bundle, 20. The second portion of the feed tube assembly is a solid block, 36', in which elongated cylindrical channels, 39, are bored. The third portion of the feed tube assembly, 36", extends through the second bundle, 21'. The cylindrical channels, 39, are in fluid communication with the first portion of the feed tube assembly and the third portion of the feed tube assembly 36". Pipe fitting, 75, is located within the solid block, so as to provide fluid communication between the central chamber and the discharge tube. FIG. 6 is a cross-section taken on line 6—6 of FIG. 5 showing the elongated cylindrical channels, 39, which carry the feed fluid from the first portion of the feed tube to the last portion of the feed tube. This assembly allows simple construction of this inventive apparatus by simply inserting section 36' in between the facing ends of the hollow fiber bundles so as to effect fluid communication between the portions of the feed tube situate within each bundle.

Figure 7:
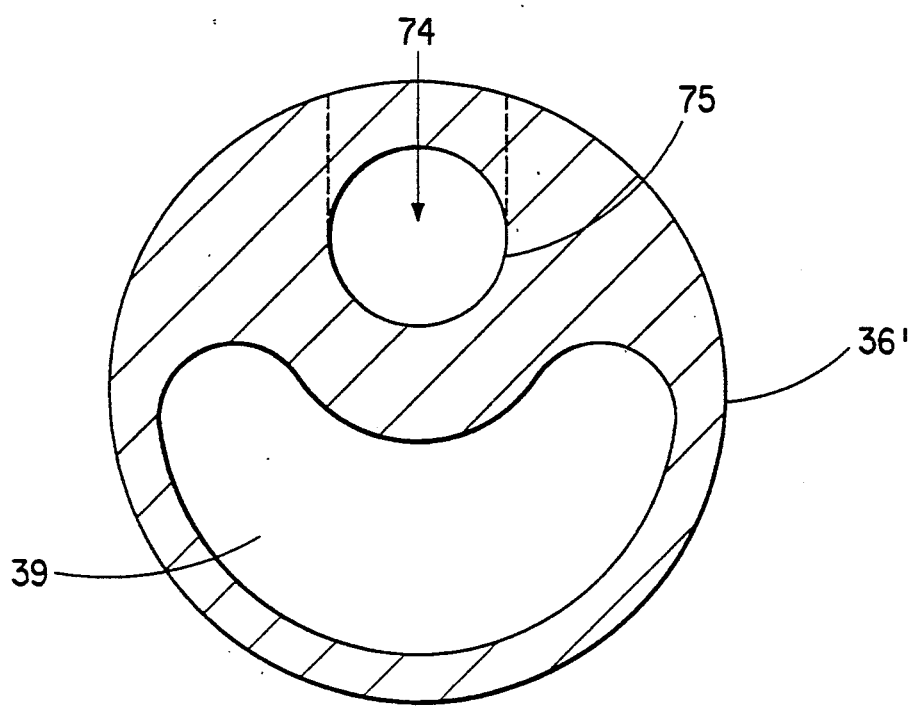
FIG. 7 is a cross-sectional showing another embodiment of the cross-section shown in FIG. 6.

An alternate embodiment of the feed tube assembly is shown in FIG. 7 which is a cross-section showing a single channel, 39, which is in fluid communication with the portions of the feed pipe. In this configuration, reject channel, 74, is eccentrically positioned allowing the flow area of feed channel, 39, to be increased with resulting reduced fluid flow pressure drop. The configuration and size of channel, 39, is not important so long as it permits sufficient flow of the feed fluid, does not have significant pressure drop and does not interfere with the operation of pipe fitting, 75.

The embodiment of the invention shown in FIG. 1 is particularly suitable for the purification of sea water or brackish water. The flow of the respective fluids through the fluid separation apparatus can readily be demonstrated by describing the purification of salt water, as follows. Still referring to FIG. 1, salt water is fed into port, 51, through adapter, 38, into the central feed tube, 36, where it is simultaneously radially distributed through the openings in the feed tube to both hollow-fiber bundles, 20 and 21. The hollow-fiber membranes are selective to one or more of the fluids, so such fluid will pass the permeable fibers more quickly than the other fluids. In this case, the hollow-fiber membranes are selectively permeable to fresh water. The product water, or the permeate, flows through the center of each hollow fiber and is collected at the ends of both hollow-fiber bundles, 20 and 21, adjacent to the respective end plates, 24 and 26. The bores of the hollow fibers adjacent to the center chamber, 64, are sealed to prevent bypassing. In summary, feed fluid generally travels through both bundles in the same pattern; i.e., radially from the feed tube into the hollow fibers, selectively permeating the hollow fibers. The permeate then exits the hollow fibers at the open ends adjacent to both end plates. The permeate may now be removed from the fluid separation apparatus. The amount and purity of permeate removed in a function of the properties of the hollow fiber, the feed temperature, the composition of the feed fluid, the feed to permeate pressure differential, and the flow rate of the feed fluid.

Figure 2:
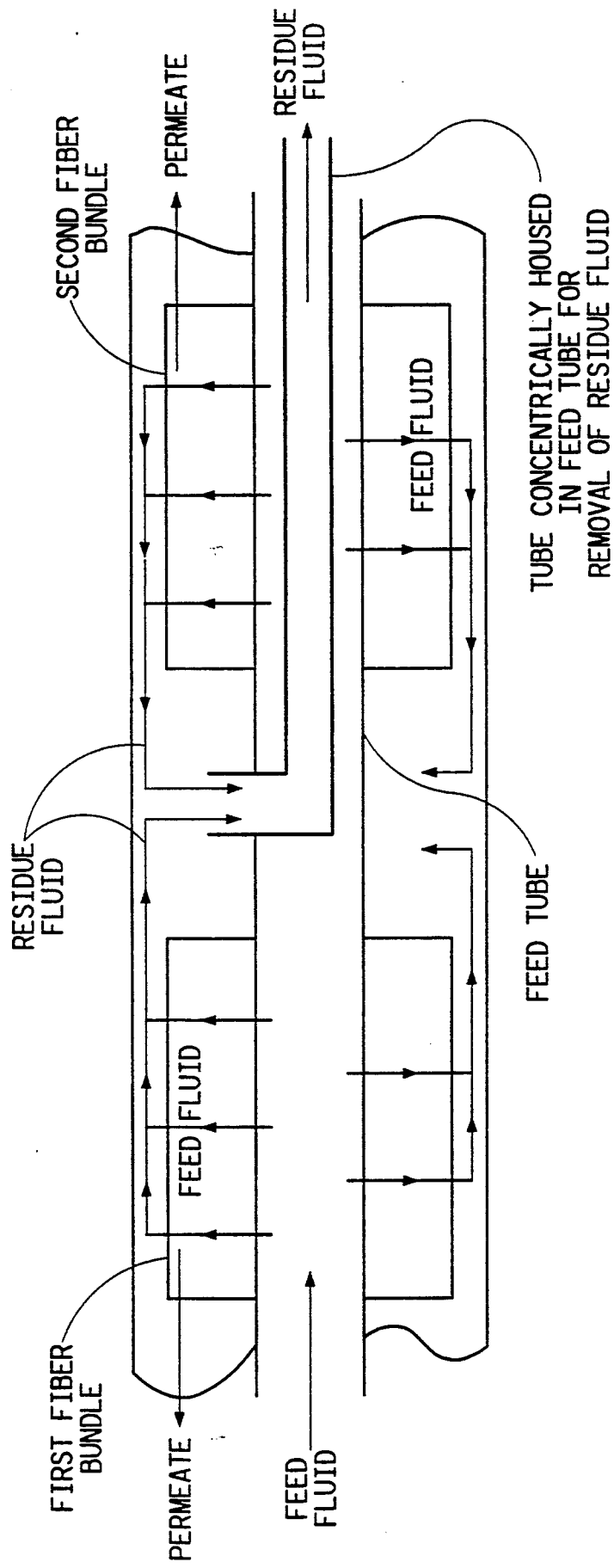
FIG. 2 is a block diagram showing the flow of the feed fluid, permeate and residue fluid through the first embodiment of the present invention.

The residue salt water flows radially outward through both bundles, 20 and 21. The salt water does not readily permeate the hollow-fiber membranes. The residue salt water is then collected in the annular spaces, 60 and 61, adjacent to the tube shell, 22, and thereafter flows to the center chamber, 64, of the apparatus where it is collected. The residue fluid then passes through the so-called "center adapter" defined by opening, 74, and connecting pipes, 75, into a discharge tube, 76, which is concentrically housed inside the feed tube, 36. The residue fluid from both bundles is ultimately discharged through one or both of the end plates by means of such concentrically housed tube, 76. In the present embodiment, the residue salt water is discharged from the fluid-separation apparatus through adapter, 40, and port, 54. Reference is also made to FIG. 2, which is a block diagram showing the flow of the respective fluids through the embodiment of the device shown in FIG. 1.

It is also possible, although not preferred, for the flow of feed fluid and residue fluid to occur in precisely the opposite directions, which is commonly known as outside-in flow. In particular, the feed fluid may be introduced through port, 54, flowing through adapter, 40, tube, 76, and connector, 75, ultimately discharging into central compartment, 64. Thereafter, the feed fluid flows into annular spaces, 60 and 61, and flows radially from the outer edge of the hollow-fiber bundles, 20 and 21, into the center of the bundles. One or more fluids selectively permeate the hollow-fiber membranes and are ultimately collected in the spaces at the end of the fluid-separation apparatus and discharge ports, 52 and 53. The residue flows into feed tube, 36, and is discharged through adapter, 38, and port, 51.

It is also apparent that the center adapter, 75, may be plugged and the fluid separation apparatus may readily be constructed with a means for collection and discharge of the residue fluid from each bundle, thereby converting the inventive fluid separation apparatus into a conventional fluid-separation apparatus with two bundles operating in series.

Feed pipes, 36, and discharge pipe, 76, as well as adapters, 38, 40 and 75, may be made of plastic material such as nylon, glass-reinforced plastic, polyvinylchloride, fiber-reinforced epoxy resin; or metals such as stainless steel; carbon steel, or titanium. The dimensions thereof such as thickness, diameter and length are not specified and may be altered to achieve the desired function.

According to the embodiment of the present fluid-separation apparatus with two hollow-fiber bundles, no additional high pressure piping for feeding or discharging the various fluids is required outside of the pressure container. The connecting pipes are merely provided within the apparatus. In particular, for a system employing the elongated two-bundle apparatus of the present invention, the number of high pressure pipes and connections will be half that of a system employing a conventional single-bundle apparatus.

In the fluid-separation apparatus of the present invention, the enlargement of the capacity of the apparatus is achieved by containing a plurality of short, relatively small diameter hollow-fiber assemblies in a pressure vessel, and hence, the apparatus does not show undesirable pressure loss of the permeate fluid and concentration polarization phenomena which appear in the conventional apparatus. When the fluid-separation apparatus (consisting of two bundles in parallel) is operated so as to get the same recovery ratio as in a conventional fluid-separation apparatus consisting of a single elongated hollow-fiber assembly with an equivalent active length of hollow fibers, the apparatus can treat the fluid at higher flow speeds with greater solute rejection.

The present invention also facilitates inside-outside flow of the fluid to be treated. The "inside-out" flow has certain advantages. In particular, the fluid separation is usually operated at high pressure, ranging from 40 to 2,000 psi. When the fluid flows at high pressure from the outside of the bundle inward, the fibers tend to nestle together, thereby resulting in non-uniform flow of the feed fluid radially through the bundle and an increase in the pressure drop radially through the bundle, along with an accompanying reduction in permeate flow. In addition to the increased pressure drop, it is believed that the feed fluid cannot uniformly access the outer surface of each hollow fiber, thereby reducing the overall effectiveness of the bundle and increasing the possibility of fouling. Inside-out flow of the fluid to be treated significantly reduces the likelihood of nestling of fibers.

Figure 4:
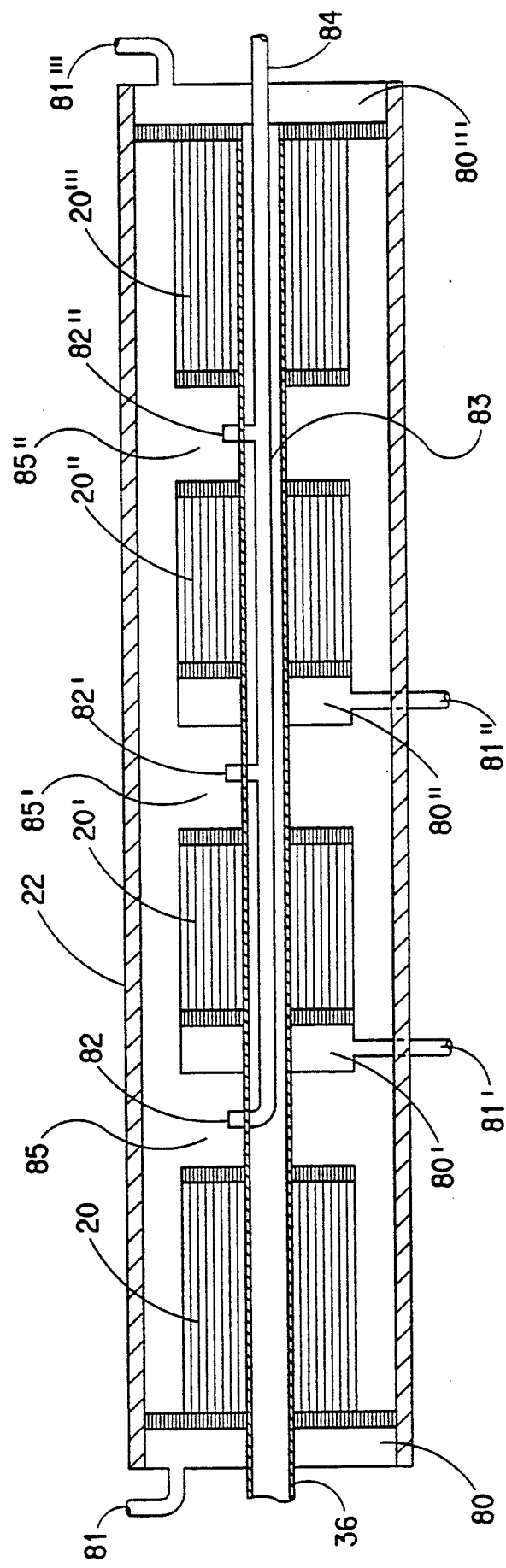
FIG. 4 is a schematic cross-sectional view of a second embodiment of the invention wherein four hollow-fiber assemblies are contained in the pressure vessel.

As shown schematically in FIG. 4, the present fluid separation apparatus may be adapted to hold a plurality of bundles. The number of hollow-fiber assemblies to be contained in the present fluid-separation apparatus may be varied after taking into consideration the overall pressure loss in flow of fluid within the apparatus and the performance of hollow fibers at a high flow speed in the assembly. The number of hollow-fiber assemblies is usually in the range of two to ten, preferably two.

A fluid separation apparatus having an increased number of hollow-fiber bundles can be assembled by providing a plurality of central compartments and a plurality of bundles in one pressure vessel. FIG. 4 schematically shows an embodiment of the invention wherein four hollow-fiber assemblies are used. The fluid separation apparatus has four hollow-fiber bundles designated as 20, 20', 20" and 20'" in a single pressure vessel 22. The fluid to be treated is supplied via feed tube 36. The feed fluid is simultaneously distributed to all four hollow-fiber bundles via openings in the feed tube 36. The fluid which permeates the hollow-fiber membranes is collected in the spaces designated as 80, 80', 80" and 80'", and ultimately discharged from the pressure vessel via ports 81, 81', 80" and 81'". The residue fluid does not readily permeate the hollow-fiber membranes and flows into the annular space in between each hollow-fiber bundle and the pressure vessel. Thereafter, the residue fluid flows into the so-called center chamber situate in between the respective bundles, 85, 85' and 85", through the openings 82, 82', 82"

and 82''', and into discharge tube, 83 housed within feed tube, 36. The center chambers 85, 85' and 85'' are defined by the facing sealed ends (and/or the sealed cavities for collecting the permeate) of adjacent bundles. The residue fluid is ultimately discharged from the pressure vessel via port, 84. In such an apparatus having an increased number of hollow-fiber bundles, although the external piping is somewhat more complicated, the advantages of the apparatus shown in FIG. 1 are further enhanced.

The hollow-fiber membranes may be of any convenient configuration, e.g., circular, hexagonal, trilobal, or the like in cross-section and may have ridges, grooves, or the like extending inwardly or outwardly from the walls of the hollow-fiber membranes. The hollow-fiber membranes may be isotropic, i.e., having substantially the same structure throughout the thickness of the wall, or anisotropic, i.e., having one or more regions within the thickness of the wall having a more dense structure. The hollow fiber membranes are useful in fluid separations, i.e., they may serve as the support for coating which provides selective separation or as the medium which affects the separation. The hollow fibers used in the present invention include all fibers having an inner diameter of about 20 microns to about 200 microns, preferably about 40 microns, and a hollow ratio (being the area of the fiber bore divided by the area of the total cross-section of the fiber) of about 10% to about 50% percent, preferably about 15%. The dimensions of the fibers and hollow ratio, as well as the dimensions of the pressure vessel, are dependent in part of the operating pressure. In general, the hollow fibers must have a thicker wall, resulting in a lower hollow ratio, for higher operating pressures. The membranes may be fabricated from various polymers such as celluloses, cellulose esters, cellulose ethers, polyamides, silicone resins, polyurethane resins, unsaturated polyester resins or the like.

The potting material to form the tube sheet may be comprised of any suitable material. Preferably the potting material can be in liquid form when preparing the tube sheet and can thereafter be solidified, e.g., by cooling, curing, or the like. The solidified potting material should exhibit sufficient structural strength for providing a tube sheet and be relatively inert to moieties to which it will be exposed during fluid separation operation. The potting material may be organic, preferably epoxy, or inorganic or organic containing inorganic material, and the potting material may be natural or synthetic. Typical inorganic materials include glasses, ceramics, cermets, metals and the like.

The pressure vessel used in the present invention is preferably a cylindrical vessel having an inner diameter of 5 cm. to 50 cm., most preferably about 25 cm., but the shape of the pressure vessel is not necessarily restricted. The thickness of the wall of the pressure vessel must be adapted to the specific operating conditions, particularly to operate safely at the operating pressure.

The fluid separation apparatus of the present invention may be applied to desalination of sea water, desalination of brackish water, purification of various kinds of waste water, preparation of ultrapure water, ultrafiltration such as recovery of paint from waste water in electrodeposition painting, liquid permeation such as separation of para-xylene from a xylene mixture, gas permeation such as recovery of helium and purification of hydrogen, and the like. In any case, it is possible to carry out efficiently a large-scale treatment by using the apparatus of the present invention.

The invention being thus described, it will be obvious that the same may be varied in many ways. Such modifications are not to be regarded as a departure from the spirit and scope of the present invention, and all such modifications are intended to be included within the scope of the following claims.

What is claimed is:

1. A hollow-fiber membrane separation apparatus which comprises:
   a pressure container composed of a shell and end plates; a plurality of hollow-fiber bundles, each comprising a cross-section bundle of hollow fibers having one end mounted in a tubesheet, which are longitudinally aligned and placed in the pressure container, said hollow-fibers having selective permeability to fluid, and being further aligned so as to form a first space between the outside of the bundles and the inside of the pressure container;
   an elongated feed member through which fluid to be treated can flow radially into and through one or more of the hollow-fiber bundles;
   a second space situate in between adjacent hollow-fiber bundles, said space being defined by the facing ends of adjacent hollow-fiber bundles and being in communication with the first space between the outside of the bundles and the pressure container;
   a first opening in the pressure container which is in communication with the elongated feed member through which the fluid to be treated is fed;
   a second opening or openings in the pressure container in communication with the open ends of the hollow fibers through which the permeate is discharged;
   an elongated discharge member housed inside said elongated feed member, said elongated discharge member being in communication with said second space; and
   a third opening in the pressure container in communication with the elongated discharge member through which the residue fluid is discharged.

2. A hollow-fiber membrane separation apparatus of claim 1 in which the pressure container is an elongated cylinder.

3. A hollow-fiber membrane separation apparatus of claim 2 in which the first space is an annular space.

4. A hollow-fiber membrane separation apparatus of claim 2 in which the two hollow-fibers are substantially identical in size and configuration.

5. A hollow-fiber membrane separation apparatus of claim 1 containing two hollow-fiber bundles.

6. A hollow-fiber membrane separation apparatus of claim 1 in which the hollow-fiber membranes in each hollow-fiber bundle has an inner diameter of about 20 microns to about 200 microns and a hollow ratio of about 10% to about 50%.

7. A hollow-fiber membrane separation apparatus of claim 1 in which the hollow-fiber membranes have an inner diameter of about 40 microns and a hollow ratio of about 20%.

8. A hollow-fiber membrane separation apparatus of claim 1 in which the elongated discharge member is concentrically housed within the elongated feed member.

9. A process for selectively separating fluids comprising a hollow-fiber membrane fluid-separation apparatus in which the hollow-fiber membrane separation apparatus comprises:

- a pressure container composed of a shell and end plates;
- a plurality of hollow-fiber bundles, each comprising a cross-section bundle of hollow fibers having one end mounted in a tubesheet, which are longitudinally aligned and placed in the pressure container, said hollow-fibers having selective permeability to fluid, and being further aligned so as to form a first space between the outside of the bundles and the inside of the pressure container;
- an elongated feed member through which fluid to be treated can flow radially into and through one or more of the hollow-fiber bundles;
- a second space situate in between adjacent hollow-fiber bundles, said space being defined by the facing ends of adjacent hollow-fiber bundles and being in communication with the first space between the outside of the bundles and the pressure container;
- a first opening in the pressure container which is in communication with the elongated feed member through which the fluid to be treated is fed;
- a second opening or openings in the pressure container in communication with the open end of hollow fibers through which the permeate is discharged;
- an elongated discharge member concentrically housed inside said elongated feed member, said elongated discharge member being in communication with said second space; and
- a third opening in the pressure container in communication with the elongated discharge member through which the residue fluid is discharged; wherein the feed fluid passes into the fluid separation apparatus through the first opening; the feed fluid is simultaneously distributed radially to two or more hollow-fiber bundles through the elongated feed tube; the feed fluid selectively permeates the hollow-fiber membranes and the permeate flows through the hollow fibers to the tubesheets at the end of each bundle and then being discharged from the pressure container through the second opening; the residue fluid flows radially through the hollow-fiber bundles and is collected in the first space between each hollow-fiber bundle and the pressure container; thereafter, the residue fluid from all hollow-fiber bundles flows into the elongated discharge member and is discharged through the third opening in the pressure container.

* * * * *